United States Patent [19]

Kiss

[11] 4,147,256

[45] Apr. 3, 1979

[54] WORM HARVESTING APPARATUS AND METHOD

[76] Inventor: Howard M. Kiss, 2526 Wilmette Ave., Titusville, Fla. 32780

[21] Appl. No.: 867,677

[22] Filed: Jan. 9, 1978

[51] Int. Cl.² ............................ B07C 5/04; B07C 9/00
[52] U.S. Cl. .................................... 209/632; 209/635; 209/692
[58] Field of Search ............... 209/632, 633, 634, 635, 209/692, 693

[56] References Cited

U.S. PATENT DOCUMENTS 1,292,820  1/1919  Lindsley ............................. 209/692

Primary Examiner—Allen N. Knowles
Attorney, Agent, or Firm—Richard D. Dixon

[57] ABSTRACT

The present invention relates to an apparatus and a method for harvesting worms from their natural habitat. The apparatus includes a frame and an elongated screen movably coupled thereto. As the screen is vibrated the worms are separated from their bedding material which includes earth, peat moss, worm eggs and castings. The smaller worms, together with the worm eggs and castings, filter through a plurality of perforations in the screen, while the larger lumps of earth, together with the larger worms, are cascaded over the width of moving conveyor. The conveyor moves along an axis of motion which is generally transverse to a longitudinal axis of motion defined by the elongated frame. Since the lumps of earth will continue to roll down the slope of the width of the conveyor, they will be separated from the worms which cling to the conveyor.

15 Claims, 4 Drawing Figures

WORM HARVESTING APPARATUS AND METHOD

BACKGROUND OF THE INVENTION

I. FIELD OF THE INVENTION

The present invention relates to an apparatus and a method for separating worms from their bedding material which includes earth, peat moss, worm eggs and castings. This invention and method are generally related to cleaning, classifying and grading systems, but the invention incorporates systems which are specifically adapted to handle the unusual requirements of separating earthworms from their environment.

II. DESCRIPTION OF THE PRIOR ART

Until recently, interest in the growth and harvesting of earthworms was restricted to those persons and commercial enterprises which were connected with the fishing industry. However, recent scientific studied concerning earthworms have indicated that these creatures are an excellent and a very economical source of high-grade protein. The earthworms require little attention and reproduce at a geometric rate in order to provide very high yields within relatively short periods of time. Worm protein is valuable for use in processed animal feeds, fish feeds, and recent experiments have indicated that earthworm protein may eventually become an important and palatable source of high-grade protein for the human diet. Worms may also be utilized in solid waste disposal systems, such as digesting the fibrous or wood based materials in solid refuse at garbage dumps.

While worms grow rapidly and are easily cared for, it is difficult to harvest the worms due to the fact that the worms burrough deeply into and cling tightly to their earthen environment. Present methods of harvesting worms include the laborious tasks of breaking up the large bedding material clumps to reveal the worms, and then removing by hand each of the worms one at a time. This method of harvesting worms is extremely labor-intensive and therefore greatly reduces the yield and profit which may be realized from the growth of these animals. Furthermore, this method of worm harvesting does not recover the valuable worm castings (or worm manure) which is given off as a by-product during the worm growth cycle. The castings must be removed from the bedding material in order for the immature worms to continue their healthy growth. The worm casting provide an extremely concentrated source of high-grade plant nutrients and as such they are in great demand for use as plant fertilizer.

As the adult worms are harvested, it is also advisable to replace, on a periodic basis, some of the natural elements which comprise the bedding materials of the worms. When the worms are harvested by hand, it is extremely difficult if not impractical to separate the rather large and hard bedding lumps which are of little use or benefit to growing worms. In many cases eggs and minute worms are hidden inside a lump of earth or peatmoss and must be separated. Ordinarily these hard bedding lumps are returned to the worm bed and merely subtract from the total volume available for use and growth by the worms. Furthermore, it is highly desirable to harvest only the mature and larger worms while leaving the immature worms and the worm eggs for further growth and maturation. In this manner the worm beds can be periodically thinned of the large and mature worms, while providing a minimum of disturbance to the immature worms and the worm eggs.

Various forms of machine and methods for growing worms and sifting soil and other mixtures have been defined in the art, but little evidence exists of any attempt to synergistically combine these disciplines to provide an efficient and cost-effective apparatus and method for harvesting earthworms from their natural habitat. Elfert, in U.S. Pat. No. 3,566,836, discloses a portable earthworm breeding chamber which includes a top comprising a screen having a plurality of perforations therein. Loftus, in U.S. Pat. No. 3,545,404, discloses a method for cultivating earthworms through the use of a slurry comprising paper and clamshells together with other various chemicals.

Axsom, in U.S. Pat. No. 3,036,710, discloses an entomologist's egg separator comprising two concentric rotatable screens of different mesh which are rotatable to separate the variously-sized elements. Reynolds, in U.S. Pat. No. 2,970,565, discloses an apparatus for harvesting mosquito eggs. Cruickshank, in U.S. Pat. No. 3,426,898, discloses a generally cylindrical soil sifter which is utilized to separate impurities of significant sizes from the soil. It should be noted at this point that none of these references disclose a sifting apparatus or method which has been specifically adapted for use in harvesting worms. In fact, the unique characteristics of the worms and their habitat strongly suggest that the previously discussed devices would be unsuitable for harvesting earthworms.

Vibrational separators for grain, solid polymer pellets and other granular materials are well known in the art. Pletcher, in U.S. Pat. No. 3,385,431, discloses a grain separator which includes a horizontally disposed screen which is vibrated to separate insects and dust from the grain which has been harvested. Burrough, in U.S. Pat. No. 3,485,364, discloses an improved apparatus for separating and classifying solid polymer pellets. James, in U.S. Pat. No. 3,183,955, discloses an oscillating grid apparatus which is utilized for separating citrus peels from the citrus pulp and juice. Barr, in U.S. Pat. No. 2,982,410 discloses an apparatus which is useful in screening high-density granular or powdered materials. Wehner, in U.S. Pat. No. 3,217,881 discloses an improved sifting apparatus which employs a plurality of rotatable cams for vibrating and impacting with the screen sifting element. Kyle, in U.S. Pat. No. 1,790,429, discloses an improved bumper device for vibrating the sifting screen. Various other designs for sifting devices are disclosed by Eby in U.S. Pat. No. 4,040,810 and Lichtenstein in U.S. Pat. No. 2,583,862.

After an extensive review of the commercially available general purpose screening equipment and a review of the special purpose worm harvesting equipment, the applicant herein discovered that the above described systems or their equivalents failed to perform in a satisfactory manner when applied to the unique requirements of economically harvesting worms from their environment. After extensive study and experimental use, the applicant has developed the herein described apparatus and method which has proven to be economically effective in harvesting worms.

SUMMARY OF THE INVENTION

The present invention relates to an apparatus and method for separating worms from their habitat which includes earth, peat moss, worm eggs and castings. The invention includes a frame and screen means movably coupled to the frame for selectively filtering the worms from their habitat. The screen means includes a perforated screen defining a longitudinal axis along an elongated section thereof, with the longitudinal axis generally sloped with regard to the horizontal for progressively filtering from a higher feed section to a lower downstream section. Vibratile means are coupled to the frame and the screen means for imparting a relative sifting motion therebetween.

Conveyor means are provided adjacent the screen means for receiving selectively filtered worms and habitat therefrom. The conveyor means includes a transverse width which is generally sloped with respect to the horizontal, and the conveyor includes an axis of motion which is oriented generally transverse to the longitudinal axis of the screen means. In this manner the worms will cling to the conveyor and be transported along the axis of motion, while the habitat will continue to roll down the sloped width of the conveyor.

Accordingly, it is an important object of the present invention to provide a conveyor movable transverse to the longitudinal axis of the separating screen for separating the worms to be harvested from the remaining unwanted habitat material. The fabrication of the conveyor using a relatively slick material and the sloping of the width of the conveyor both assist in the highly efficient separating capabilities of the present invention and the method corresponding thereto.

Still another important object of the present invention is to provide a system of beater bars which prevent the worms from squeezing through or holding onto the otherwise passable apertures in the sifting screen.

Still another important object of the present invention is to provide an economical apparatus and method for separating the worm castings from the worms, the earth, and the worm eggs.

A still further important object of the present invention is to return the immature worms, together with the worm eggs and finely sifted soil, to the worm beds in order to promote accelerated growth of the remaining worm population. Thus, by scientifically thinning the population of the worm bed, the growth of the remaining population may be significantly enhanced.

BRIEF DESCRIPTION OF THE DRAWINGS

Other objects, features and advantages will be apparent from a study of the written description and the drawings in which.

DESCRIPTION OF THE PREFERRED EMBODIMENT

Figure 1:
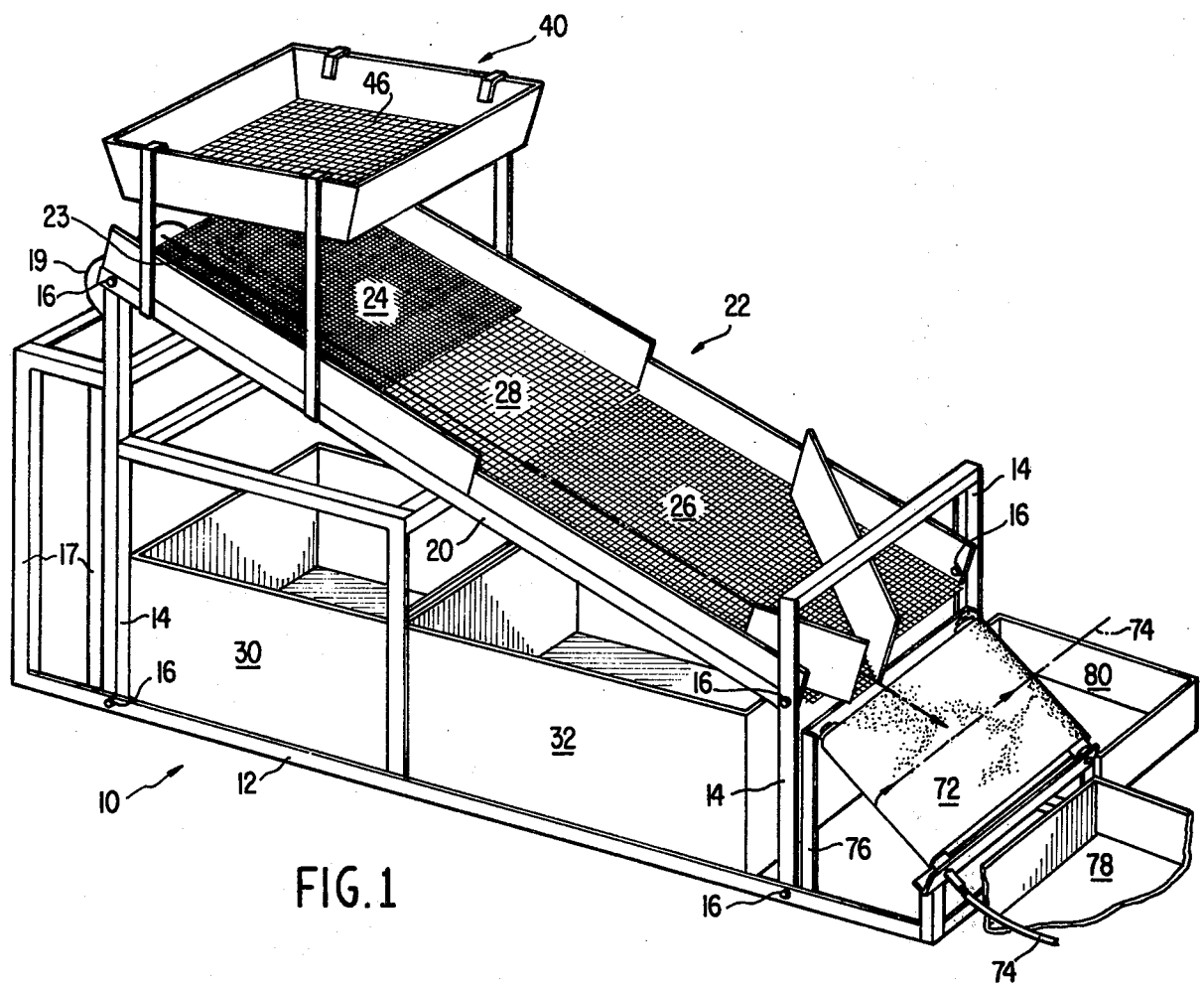
FIG. 1 illustrates a frontal perspective view of a worm harvesting apparatus in accordance with the teachings of the present invention.
Figure 2:
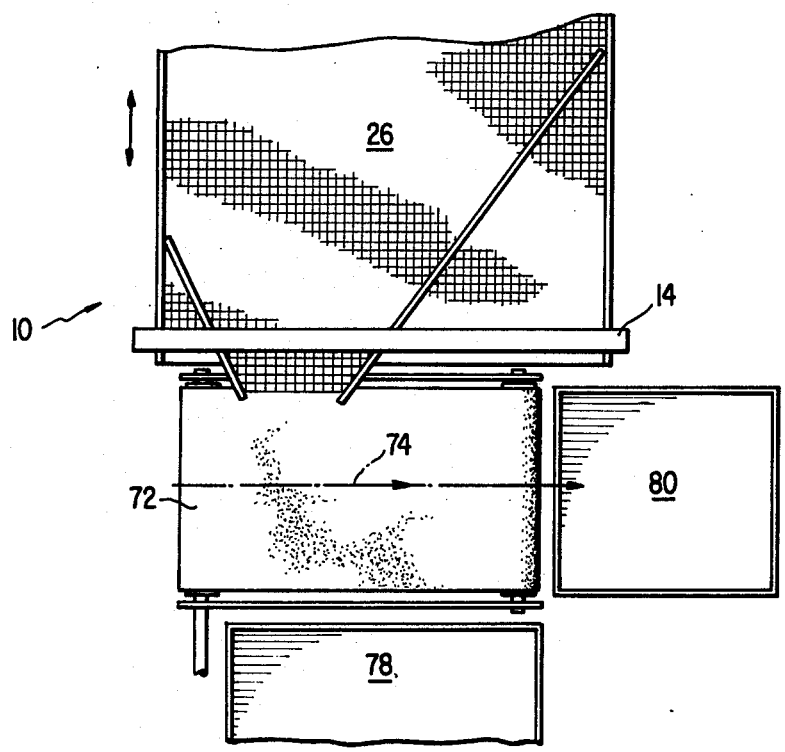
FIG. 2 is a top view of the downstream section of the screen means together with the conveyor means.
Figure 3:
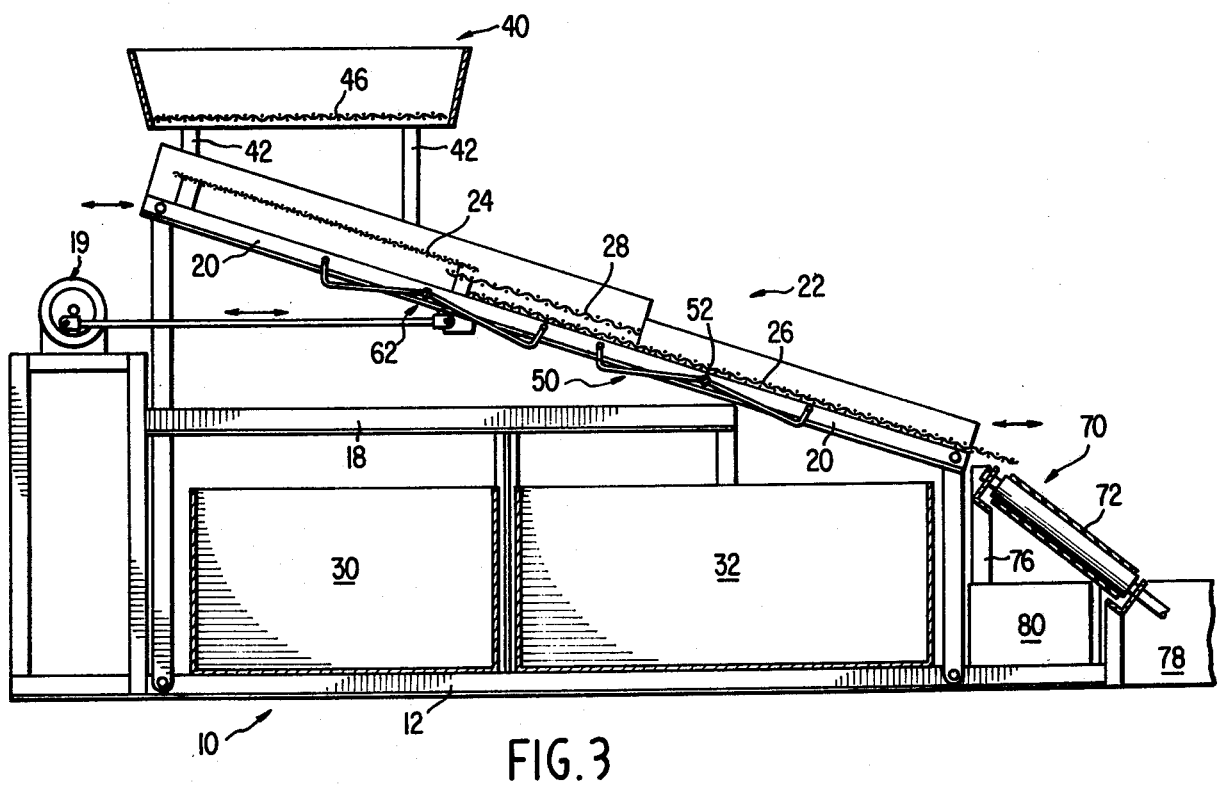
FIG. 3 illustrates a frontal cross-section view taken along the longitudinal axis 23 as illustrated in FIG. 1.

The worm harvesting apparatus, shown generally as 10 in FIGS. 1, 2, and 3, includes a frame having a generally rectangular base 12 and four generally upstanding supports 14 located at the corners thereof. A generally rectangular screen frame 20 is coupled to the distended ends of the upstanding supports 14. The base 12, the upstanding supports 14, and the screen frame 20 are all movably coupled through the use of a plurality of pivots 16 which allow the entire frame assembly to move back and forth along a longitudinal axis 23 defined along the plane shown in FIG. 1 and generally coincident with the feedline of the screen frame 20.

A stationary subframe 17 is also provided adjacent to the movable main frame, but vibrationally isolated therefrom. The stationary subframe 17 includes a generally horizontal stationary member 18 which communicates below the screen frame 20. An electro-mechanical motor, cam assembly and drive assembly 19 are coupled between the stationary subframe 17 and the screen frame 20 for transmitting impulsive energy therebetween for vibrating, in a generally back-and-forth motion, the screen frame 20 along the longitudinal axis 23 thereof.

Screen means, shown generally as 22 in FIGS. 1 and 3, includes a feed section 24 located at the higher elevation and a downstream section 26 located at a lower portion of the screen means 22. The feed section 24 includes a plurality of perforations of sufficient diameter to allow the worm castings to pass therethrough, while at the same time preventing the passage of the worm eggs, the worms, the earth and peat moss combination which form the bulk of the worm habitat. Typically the feed section 24 comprises a screen having a plurality of generally rectangular perforations therein of approximately one-sixteenth (1/16th) inches, which typically allows only the small sized castings to pass therethrough. These castings are collected in a movable castings bin 30 removably mounted subjacent thereto.

The downstream section 26 of the screen means 22 typically comprises a screen having a plurality of generally square apertures therethrough of approximately one-fourth inches (¼"). The size of these apertures have been determined so as to pass approximately one-half of the worms resident in the habitat, together with fifty to seventy five percent (50–75%) of the fine-mulched earth and the small worm eggs therein. These portions of the habitat are collected within a return bin 32 removably mounted subjacent thereto. The size of the apertures within the downstream section 26 have been determined to allow the passage of small immature worms therethrough without allowing the passage of the larger more mature worms which are forced by the vibrational energy to travel downwardly along the longitudinal axis 23 of the screen means 22. The size of these apertures may be varied in accordance with the size of the specific worms which are being harvested.

An intermediate screen action 28 is removably coupled to the screen frame 20 between the feed section 24 and the downstream section 26. This intermediate screen section 28 includes therein a plurality of generally rectangular apertures of approximately three-eighths inches (⅜") in order to break up any residual earthen lumps or balls prior to their traveling over the downstream section 26.

A feed hopper 40 is rigidly attached to screen frame 20 by the feed supports 42, thereby allowing the vibrational energy from the electromechanical motor 19 to be transmitted therethrough. The feed hopper 40 also includes in a lower section thereof a separator screen 46 having therein a plurality of generally rectangular apertures of approximately three-eights inches (⅜"). As the feed hopper 40 is vibrated, the worms and their habitat, which comprise worm eggs, worm castings, lumps of earth and peat moss, are severly shaken to the point that the earth clumps, or balls, crumble and fall through the separator screen 46 onto the feed section 24. As the larger sections of earth crumble, the worms together with their eggs and castings also fall through the separator screen 46. The vertical separation between the separator screen 46 and the feed section 24 is determined to cause a large majority of the remaining earthen balls and clumps to break up upon impact with the feed section 24 having the smaller perforations therein.

Figure 4:
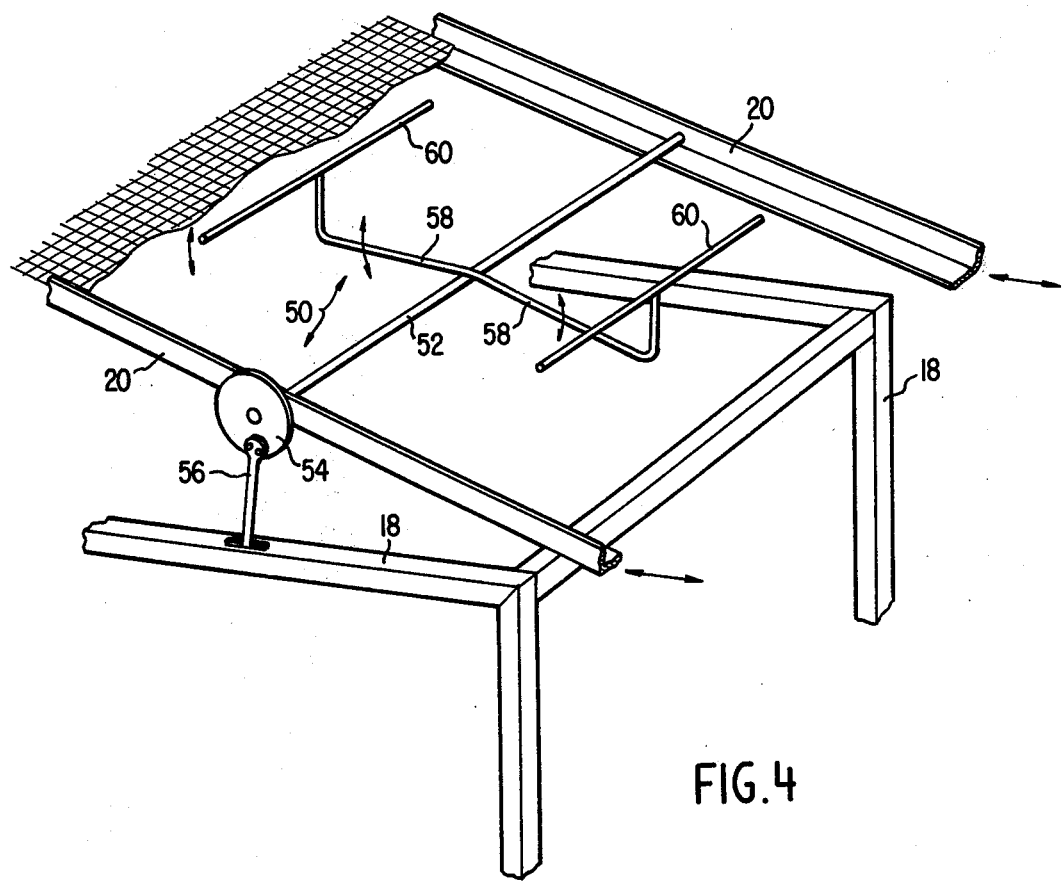
FIG. 4 is a cutaway frontal elevation of one of the beater bar assemblies in accordance with the present invention.

While the size of the apertures within the screen means 22 are determined to allow the selective passage therethrough of the crumbled earth and peat moss together with the smaller worms and the worm eggs, it is nevertheless possible for the larger worms to sometimes "squeeze through" these smaller openings, since a mature worm can reduce its effective diameter with great efficiency for passing through smaller apertures. Therefore, in order to prevent the passage of the smaller worms through the apertures within the screen of the section 24, and in order to prevent the passage of the larger worms through the apertures in the screen of the downstream section 26, and in order to provide additional vibrational energy for breaking up the clumps and balls of earth or bedding material as they travel along the longitudinal axis 23 of the screen means 22, a plurality of beater means, shown generally as 50 in FIGS. 3 and 4, are provided.

The beater means 50 comprise a central shaft 52 which rotatably communicates between opposed sections of the screen frame 20. A cam 54 is coupled to the central shaft 52 and also is coupled through a cam rod 56 to the stationary frame 18. The geometry of the cam 54 and the cam rod 56 provide a periodic angular rotation of the central shaft 52 as the screen frame 20 is moved back and forth, generally in the plane of the longitudinal axis 23, by the operation of the electromechanical motor 19. Two coupler bars 58 are attached generally transverse to the central axis of the central shaft 52. Beater bars 60 are attached to the distended ends of the coupler bars 58 for moving in a vertical direction to impact the lower section of the screen means 22 as the central shaft 52 is periodically rotated by operation of the cam 54. The beater means 50 comprise a pair of these beater assemblies, with a second beater assembly, shown generally as 62, being attached generally subjacent to the feed section 24 of the screen means 22. As the beater means 50 are driven to impact the lower section of the adjacent portion of the screen means 22, the additional impacting energy serves to break up the larger balls or clumps of bedding material and to prevent the unwanted worms from gaining a "foot-hold" in order to initiate their process of traveling through the apertures within the screen means 22.

The vibrational operation of the feed hopper 40, the vertical fall of the worms and their habitat onto the feed section 24, the vibration of the feed section 24 and the vibration of the downstream section 26 will serve to break up the larger clumps of bedding material, to allow the castings to fall through the feed section 24 and into the casting bin 30, and to allow the eggs and smaller worms to fall through the apertures in the downstream section 26 and into the return bin 32. In this manner the contents of the return bin 32 may be returned to the worm-growing beds and will serve as a basis for the proper growth of the immature and smaller worms as well as the worm eggs.

Therefore, this selective filtering process of the screen means 22 will provide, at the lower end of the downstream section 26, a mixture of larger bedding clumps (generally of a hard and dry nature), and the larger worms. These larger worms and the earthen balls are moved along the longitudinal axis 23 and gravitationally fall upon a conveyor means 70.

The conveyor means 70 includes a conveyor 72 having a width thereof generally along the longitudinal axis 23 of the screen means 22. The conveyor 72 is driven along an axis or direction of motion 74 which is generally perpendicular to the longitudinal axis 23 of the screen means 22. The conveyor 72 comprises a flexible fabric-type material which is operatively non-adhesive to the hard bedding balls, and yet somewhat operatively adhesive to the worms incident thereupon. Therefore, as the worms fall onto the width of the conveyor 72 they may cling to the conveyor material, while the hard earthen balls falling upon the conveyor 72 will continue to roll in a direction generally along the longitudinal axis 23, since the width of the conveyor 72 is inclined with respect to the horizontal. In this manner the hard earthern or bedding balls and other residue will continue to roll across the width of the conveyor 72 and into an earthen residue or dirt-ball bin 78.

On the other hand, the larger worms will cling to the surface of the conveyor 72 and will be transported along the direction of motion 74 which is generally perpindicular to the motion of the earthen balls. The length of the conveyor 72 is determined such that all of the bedding balls will traverse the width of the conveyor 72 prior to the worms thereon being deposited within a worm bin 80 located adjacent the end of the conveyor 72. The speed of motion of the conveyor 72 is sufficiently slow so that the bedding balls have sufficient time to communicate across the entire width of the conveyor 72, but the speed is sufficiently fast to prevent the bedding balls and residue from piling up against the worms as they cling to the upper surface of the conveyor 72. The drive energy for transporting the conveyor 72 along its direction of motion 74 has been simplified in the drawings for the sake of clarity. Generally, this drive energy is provided through a flexible shaft 74 or belt from the electromechanical motor 19, but other drive arrangements can be fabricated to accomplish these same functions. However, it should be noted that the frame 76 which supports the conveyor is not vibrationally coupled to the screen frame 20 or the upstanding supports 14, thereby preventing the vibrational energy from being transferred thereto.

The operation of the apparatus and method in accordance with the present invention will now be described with reference to FIGS. 1, 2, 3 and 4. It is generally necessary to harvest the worms growing in a worm bed approximately once every thirty to sixty days. The purpose of this harvesting activity is not only to remove the mature worms from the worm beds, but also to remove byproducts of the worm growth and also to cleanse or replace a portion of the bedding material. The worm beds are generally placed adjacent to the worm harvesting apparatus 10 and the worms together with their habitat are manually or mechanically loaded into the feed hopper 40. The vibration of the feed hopper 40 then causes the large moist balls of earth or bedding material to break apart as they vibrationally contact the separator screen 56. The worms, the worm eggs, the worm castings, and the smaller balls or clumps of bedding material then fall from the hopper 40 onto the screen in the feed section 24 of the screen means 22. This impact will cause an additional reduction in the size of larger clumps or balls of bedding material, but generally will not reduce the size of the larger hardened or dry balls of earth. The size of the apertures within the screen of the feed section 24 will allow only the worm castings to communicate therethrough to be collected within the castings bin 30 therebeneath.

The remainder of the worms and their habitat will be vibrationally transferred generally along the direction of the longitudinal axis 23 by the energy transferred from the electromechanical motor 19 to the screen frame 20 of the screen means 22. The back and forth motion of the screen means 22, together with the sloping angle of the screen frame 20, will incrementally move the worms and their habitat from the higher feed section 24 toward the lower downstream section 26. As the moist earthen balls move generally along the longitudinal axis 23, the vibrational energy imparted thereto, together with the action of the intermediate screen section 28 and the downstream screen section 26, will further reduce the size of these clumps or balls.

The smaller worms, together with the worm eggs and the smaller balls or clumps of earth, will communicate through the apertures within the screen comprising the downstream section 26 of the screen means 22, to be collected within the return bin 32. The size of the apertures within the screen comprising the downstream section of the screen means 22 will determine the percentage of the earth habitat which is returned to the worm beds. Generally, the worm farm operator desires to return between fifty and seventy-five percent (50-75%) of the earthen materials together with all of the worm eggs to the worm beds. Then, additional earth material together with worm feed and various other nutrients may be added to the worm bed as required.

The operation of the beater means 50 will prevent the passage of unwanted worms through the apertures within the screens comprising the feed section 24 and the downstream section 26 of the screen means 22. Furthermore, the impact energy imparted to the screen means 22 by the operation of the beater means 50 will also assist in the breaking up of the moist earthen balls and bedding material.

The larger worms to be harvested, together with the remainder of their earthen habitat (generally hardened earthen balls or large moist clumps of earth), will communicate over the end of the lower downstream section 26 of the screen means 22 and will impact upon the upper section of the conveyor 72. The large worms, having been greatly excited and irritated by the vibration of the screen means 22 and the beater means 50, will attempt to cling to the non-vibrating surface of the conveyor 72. These worms generally have sufficient control over their body movement and orientation to prevent any motion which would cause them to fall off of the bottom edge of the width of the conveyor. However, the remaining earthen balls or clumps of bedding material, generally having a spherical or semi-spherical shape, will continue to roll in the direction of the longitudinal axis 23 across the width of the conveyor 72 to be deposited within the earthen residue bin 78. On the other hand, the worms will cling to the conveyor belt 72 until they are dumped into the worm bin 80 adjacent the end thereof.

In this manner the apparatus and method in accordance with the present invention will selectively filter the material comprising the worm bed into its constituent parts including worm castings, a mixture of smaller immature worms together with worm eggs and a percentage of the bedding material, the unwanted or undesirable earthen residue (generally hardened balls of earth), and finally the larger more mature worms. Additional filtration and separation is generally not required since the apparatus and method in accordance with the present invention are extremely effective in separating the worms and their habitat into the required constituent elements.

It will be obvious to one skilled in the art that additional conveyors may be substituted for the multiple bins 30, 32, 78 and 80 in order to continuously remove these constituent elements from the vicinity of the worm harvesting apparatus 10. Furthermore, the size of the worm harvesting apparatus 10 may be adjusted so that the actual worm bin is insertable in place of the return bin 32. In this manner the contacts of the bin may be immediately removed, processed and a portion thereof returned into the worm bin without further processing or transportation.

Thus, a first preferred embodiment of the apparatus in accordance with the method of the present invention has been illustrated as an example of the invention as claimed. However, the present invention should not be limited in its application to the details illustrated in the accompanying drawings of the specification, since this invention may be practiced and constructed in a variety of different embodiments. Also, it must be understood that the terminology and descriptions employed herein are used solely for the purpose of describing the general operation of the preferred embodiment and therefore should not be construed as limitations on the operability of the present invention.

I claim:

1. An apparatus for separating worms from their bedding material which generally includes earth, peat moss, worm eggs and castings, said apparatus comprising in combination:
   a frame;
   screen means operably coupled to said frame for selectively filtering worms from their bedding material, said screen means including a perforated screen having a feed section and a downstream section with a longitudinal axis defined therebetween, with said longitudinal axis generally sloped with regard to the horizontal for progressively and selectively filtering the worms and their bedding material from said feed section to said downstream section;
   vibratile means coupled to said frame and said screen means for imparting relative motion therebetween; and
   conveyor means adjacent said screen means for receiving the selectively filtered worms and bedding material therefrom, said conveyor means including a conveyor having a width inclined with regard to the horizontal and having an axis of motion generally transverse to said width and to said longitudinal axis, whereby the worms will cling to said conveyor and will be transported along said axis of motion while the bedding material will continue to roll down said width of said conveyor.

2. The worm harvesting apparatus as described in claim 1 wherein said conveyor is spaced generally along said longitudinal axis from said downstream section of said screen means for receiving therefrom the selectively filtered worms and their habitat.

3. The worm harvesting apparatus as described in claim 2 wherein said conveyor means is insulated from the vibration of said screen means and said vibratile means.

4. The worm harvesting apparatus as described in claim 2 wherein an operative surface of said width of said conveyor is operatively adhesive with respect to the worms but operatively non-adhesive with respect to bedding material.

5. The worm harvesting apparatus as described in claim 4 wherein said conveyor means move along said axis of motion at a speed sufficiently slow to allow the bedding material to roll off a lower edge of said width of said conveyor, but sufficiently rapid to prevent the bunching of the worms and their bedding material thereon.

6. The worm harvesting apparatus as described in claim 2 wherein said screen means includes adjacent to said feed section a first screen section having perforations therein of relatively small diameter for vibrationally and gravitationally passing therethrough the castings while blocking the worms and the remainder of their bedding material.

7. The worm harvesting apparatus as described in claim 6 wherein said screen means includes a second screen section having therein perforations of relatively larger diameter for vibrationally passing therethrough smaller particles of earth, peat moss, worm eggs and smaller worms while blocking the passage of larger worms and the remainder of their bedding material.

8. The worm harvesting apparatus as described in claim 7 further includng beater means coupled to said vibratile means for periodically impacting said screen, thereby preventing the larger worms from coupling with and squeezing through said perforations therein.

9. The worm harvesting apparatus as described in claim 8 wherein said beater means comprises in combinations;
 a central shaft rotatably coupled at distended ends thereof to said screen means;
 a cam coupled to said central shaft and said frame for imparting periodic angular rotation to said central shaft responsive to relative motion between said frame and said screen means;
 coupler elements transversly attached to said central shaft for being rotated thereby; and
 beater bars coupled to said coupler elements for being reciprocated into communication with said screen responsive to the rotation of said central shaft.

10. The worm harvesting apparatus as described in claim 8 wherein said vibratile means moves said screen means generally back and forth along said longitudinal axis thereof, whereby the worms and their habitat will gravitationally and incrementally progress from said feed section to said downstream section.

11. The worm harvesting apparatus as described in claim 2 further including feed hopper means coupled to said vibratile means and to said frame generally above said feed section of said screen means, with said hopper means including therein screen separator means for coarsly separating the worms from the earth, peat moss, eggs and castings.

12. A method for separating worms from their bedding material including earth, peat moss, worm eggs and castings, said method comprising the steps of:
 (a) reducing the size of the larger clumps of bedding material and separating the worms therefrom;
 (b) passing the bedding material and the worms over the width of an inclined conveyor having a longitudinal direction of motion generally transverse to said width, whereby the selectively filtered bedding material will roll down said width of the inclined conveyor but the worms will be transported along said longitudinal direction of motion of said inclined conveyor to be collected separately;
 (c) collecting the selectively filtered bedding material as it rolls off of said width of said inclined conveyor; and
 (d) collecting the worms from said inclined conveyor after the bedding material has been separated therefrom.

13. The method for separating worms from their bedding material as described in claim 12 wherein step (a) includes the substep of (al) vibrating the worms and their bedding material for breaking up the bedding material and separating the worms therefrom.

14. The method for separating worms from their bedding material as described in claim 13 wherein said step (a) includes the substep of (a2) filtering the bedding material over small diameter apertures for removing the castings therefrom.

15. The method for separating worms from their bedding material as described in claim 14 wherein step (a) includes the substep of (a3) filtering the worms and the bedding material over larger diameter apertures for removing the smaller clumps of bedding material, eggs and smaller worms therefrom.

* * * * *